Aug. 13, 1957  A. R. EBBERTS  2,802,604
DEVICE FOR DISPENSING AND APPLYING PREDETERMINED
QUANTITIES OF A FLOWABLE MATERIAL
Filed July 22, 1955
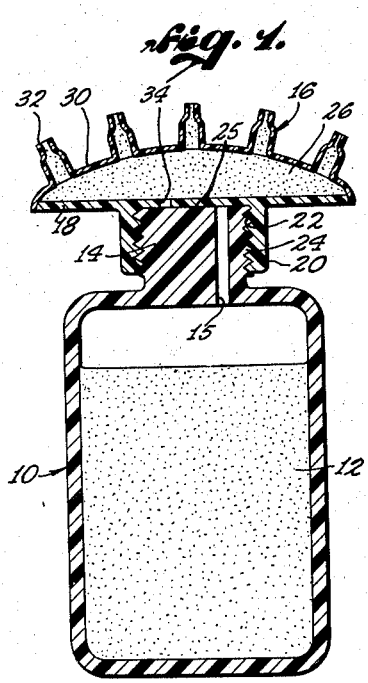
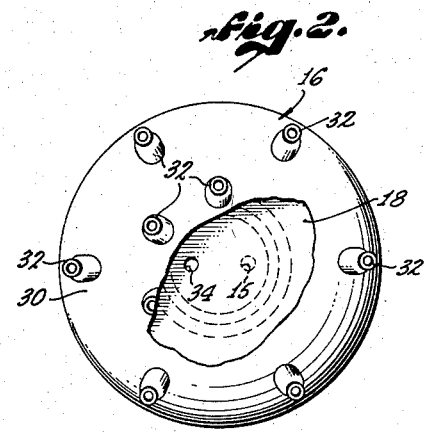
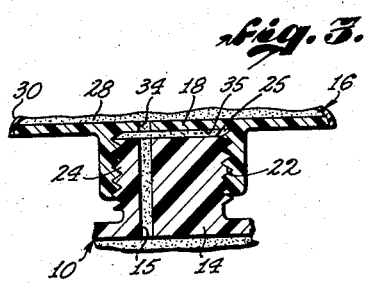
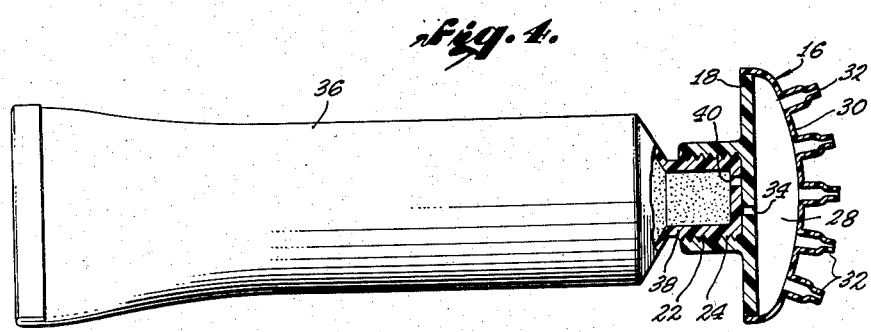
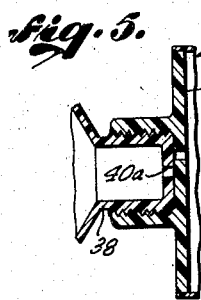
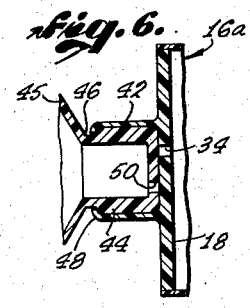
AVERY R. EBBERTS,
INVENTOR.
BY George J. Smyth
ATTORNEY.

United States Patent Office 2,802,604
Patented Aug. 13, 1957

2,802,604

DEVICE FOR DISPENSING AND APPLYING PREDETERMINED QUANTITIES OF A FLOWABLE MATERIAL

Avery R. Ebberts, Los Angeles, Calif.

Application July 22, 1955, Serial No. 523,887

3 Claims. (Cl. 222—207)

This invention relates to containers for dispensing flowable materials such as liquids and pastes and is directed to such a container that may be used as an applicator for dispensing predetermined quantities of flowable material.

While the invention is broadly applicable for its purpose of dispensing predetermined quantities of flowable material, it has been initially embodied in a container for use as an applicator for applying predetermined quantities of a flowable material. In this instance, the flowable material is a liquid shampoo. It is apparent that such an applicator may also be used for the application of various lotions, creams, medications and the like. This initial embodiment of the invention has been selected for the present disclosure and will provide adequate guidance for those skilled in the art who may have occasion to apply the same principles to other specific purposes.

The usual container for dispensing a shampoo liquid or the like does not afford adequate control with respect to the quantity of the flowable material that is dispensed. This lack of control too often leads to the wasteful release of excessive quantities of the material, and such waste is especially likely to occur in the application of fluid such as a shampoo liquid to the user's head, since the user's eyes are usually closed during the application procedure. The present invention makes possible an application procedure in which the dispensing device may be readied in advance to dispense a predetermined quantity of the flowable material and then may be operated to dispense this predetermined quantity automatically.

The invention comprises a suitable container with a dispensing head thereon that forms a dispensing chamber with at least one dispensing orifice or nozzle. The dispensing head is rotatably mounted on the container to rotate between an open position and a closed position. At the open position of the dispensing head relative to the container, the chamber formed by the dispensing head is in communication with the interior of the container to receive a quantity of the flowable material therefrom, this quantity being predetermined by the volumetric capacity of the dispensing chamber. At the alternate closed rotary position of the dispensing head relative to the container, the dispensing chamber is completely cut off from the interior of the container.

The dispensing chamber has an outer wall portion of yieldable material, preferably rubber-like material, whereby pressure may be applied to the dispensing head manually when the dispensing head is in its closed position thereby to cause the dispensing chamber to be contracted for discharge of the flowable material therein. For use in dispensing the shampoo material the dispensing head has a plurality of spaced discharge nipples of the same flexible or rubber-like material. Thus when the dispensing head is rubbed against the user's head with light pressure, the shampoo material is discharged through the various flexible nipples whereby the nipples serve not only as dispensing orifices but also as means to spread the material over the user's head. In addition, the dispensing nipples provide a desirable rubbing or brushing effect to facilitate the cleansing action of the shampoo liquid.

The container has a cylindrical portion with a discharge passage therethrough and the dispensing head is rotatably mounted on this cylindrical portion of the container. The dispensing head has an inlet port positioned eccentrically relative to the axis of rotation of the dispensing head and at the closed position of the dispensing head, this outlet port is out of register with the outlet passage of the container to cut off fluid communication between the interior of the container and the dispensing chamber. At this cut-off position of the dispensing head, the inlet port registers with a blank portion of the container.

In one practice of the invention, the dispensing head is mounted on the cylindrical portion of the container by screw threads so that the inlet port of the dispensing chamber may be tightened against the blank portion of the container at the closed position of the dispensing head. This tightening action is highly effective to prevent escape of the flowable material from the dispensing head in any manner other than by discharge through the rubber-like nipples. In another practice of the invention, the dispensing head is simply journalled on the container to rotate between its open and closed position, both the inlet port of the dispensing head and the outlet port passage of the container being positioned eccentrically of the axis of the rotation of the dispensing head so that the inlet port of the dispensing head may be rotated into and out of registry with the outlet passage of the container.

The various features and advantages of the invention will be understood from the following detailed description considered with the accompanying drawing.

In the drawing, which is to be regarded as merely illustrative:

Figure 1 is a longitudinal sectional view of a container in the form of a bottle embodying the invention, the dispensing head of the container being turned to its closed position;

Figure 2 is a plan view of the container shown in Figure 1 with a portion of the wall of the dispensing head broken away;

Figure 3 is a fragmentary sectional view similar to Figure 1 showing the dispensing head turned to its open position;

Figure 4 is a view partly in side elevation and partly in section, showing a container in the form of a collapsible tube embodying the invention, the dispensing head being shown in its closed position;

Figure 5 is a fragmentary sectional view similar to Figure 4 showing the outlet passage of the container in a concentric position instead of in an eccentric position; and Figure 6 is a similar fragmentary view showing how the dispensing head may be simply journalled on the container instead of mounted thereon by screw threads.

In the first embodiment of the invention shown in Figures 1 to 3, a container 10 holding a body of fluid 12 has a neck portion 14 of cylindrical configuration, this neck portion being solid except for a relatively small outlet passage 15. Preferably, the container 10 is made of a flexible plastic material to provide yieldable container walls whereby the container may be manually squeezed to cause the fluid 12 to be discharged through the outlet passage 15 in a well known manner.

A dispensing head, generally designated by numeral 16, has a relatively rigid transverse bottom wall 18 and a cylindrical extension 20 integral therewith, this cylindrical extension being adapted to embrace the cylindrical portion 14 of the container in a rotatable manner. In the present construction, for example, the cylindrical extension 20 of the dispensing head 16 has internal screw threads 22 in engagement with external screw threads 24 of the neck portion 14 of the container. By virtue of this arrangement, the dispensing head 16 may be screwed tight to place the bottom wall 18 of the dispensing head tight against the outer end surface 25 of the container neck 14.

The dispensing head 16 provides what may be termed a dispensing chamber 26 having at least one discharge orifice or nozzle, and it is contemplated that at least a portion of the walls of this dispensing chamber will be yieldable to permit the dispensing chamber to be contracted volumetrically by manual pressure for the purpose of discharging the liquid or flowable material therefrom.

In the construction shown, a dispensing chamber 26 is defined in part by the relatively rigid bottom wall 18 and in part by a bulbous or dome-shaped wall 30 of relatively soft rubber-like material, the edges of which are suitably bonded to the edges of the bottom wall 18. Since this embodiment of the invention is intended to serve as an applicator for a shampoo liquid, preferably the dispensing head 16 has a plurality of dispensing nipples or nozzles 32 that are unitary with the rubber-like wall 30 and are made of the same soft resilient material.

The relatively rigid bottom wall 18 of the dispensing head has an inlet port 34 which is positioned eccentrically relative to the axis of rotation of the dispensing head and this inlet port is so located in the bottom wall 18 as to register with a blank portion of the end surface 25 of the container neck 14 when the dispensing head is screwed tight at what may be termed the closed rotary position of the dispensing head. As may be seen in Figure 1, a blank portion of the bottom wall 18 is also pressed tight against the outer end of the outlet passage 15 in the container neck 14. Thus the dispensing chamber 28 is completely cut off from the interior of the container 10 in a positive manner at the closed rotary position of the dispensing head 16.

When the dispensing head 16 is unscrewed sufficiently to cause a gap or space 35 to form between the bottom wall 18 and the end surface 25 of the bottle neck as shown in Figure 3, this gap or space provides communication between the outlet passage 15 of the container and the inlet port 34 of the dispensing head. Preferably, but not necessarily, the outlet passage 15 is eccentrically located in substantially the same manner as the inlet port 34, i. e. is at approximately the same distance from the axis of rotation of the sensing head, so that when the dispensing head is unscrewed 180° from the position shown in Figure 1, the inlet port 34 is positioned in alignment with the outlet passage 15 as shown in Figure 3.

The manner in which this embodiment of the invention serves its purpose may be readily understood from the foregoing description. In preparation for use of the device as a shampoo applicator, for example, the dispensing head 16 is rotated from its normally closed position shown in Figure 1 to an open position such as shown in Figure 3 and then an increment or predetermined quantity of the shampoo liquid 12 is transferred from the container 10 through the outlet passage 15 and the inlet 34 into the dispensing chamber 28. Such a transfer of material may be accomplished simply by squeezing the yieldable walls of the container 10 for volumetric contraction of the container. With the container upright, it is a simple matter to squeeze the container in this manner until the shampoo liquid appears at the external ends of the dispensing nozzles 32, whereupon the dispensing head is rotated back to its normal closed position. In this manner the dispensing chamber 28 may be filled with a quantity of the liquid 12 with the liquid trapped against return to the interior of the container as shown in Figure 1.

The device may then be used as an applicator by pressing or rubbing the dispensing head 16 against the user's head. The manual pressure created in this manner against the yieldable wall 30 of the dispensing head contracts the volume of the dispensing chamber 28 and consequently causes the liquid in the dispensing chamber to be discharged through the various nozzles 32. As the user shifts the dispensing head from one position to another in the application procedure, the yieldable wall 30 is naturally subject to varying pressure to create a certain pumping action for discharge of the liquid material from the dispensing head. Thus the shampoo material in the dispensing chamber 28 is progressively dispensed and distributed over the user's head with the discharge nozzles 32 serving not only as spreaders for the released material but also serving as rubbing means to facilitate the cleansing action of the shampoo composition. After all of the material has been discharged from the dispensing chamber 28, the dispensing head 16 may continue to serve in this manner as means to spread the dispensed material and to rub the dispensed material into the user's scalp.

The second embodiment of the invention shown in Figure 4 is largely identical with the first embodiment as indicated by the use of corresponding numerals to designate corresponding parts. Thus the dispensing head 16 is the same in both forms of the invention.

This second embodiment of the invention differs from the first embodiment in the use of a container 36 in the form of a collapsible tube, which tube may be made of relatively soft metal in the same manner as conventional tooth paste tubes. The collapsible tube 36 has a screw threaded neck 38 with a short outlet passage 40.

At the closed rotary position of the dispensing head 16 shown in Figure 4, the dispensing chamber 28 is cut off from the interior of the collapsible tube 36 by virtue of the fact that the inlet port 34 is tight against the blank portion of the neck 38 and also by virtue of the fact that the bottom wall 18 of the dispensing head is tight against the outer end of the outlet passage 40. It is apparent that this embodiment of the invention may be used in the same manner as the first embodiment of the invention. This second embodiment of the invention may be used advantageously for dispensing relatively viscous material and may be used, for example, to apply medicament to small animals.

Figure 5 which shows substantially the same structure as shown in Figure 4, illustrates the fact that the outlet passage 40 need not be positioned eccentrically in the container neck. Thus the outlet passage 40a in Figure 5 is positioned concentrically of the neck 38.

Figure 6 shows another form of the invention which is largely similar to the previously described constructions as indicated by the use of corresponding numerals to indicate corresponding parts. In Figure 6 the dispensing head 16a is of the same construction as shown in Figure 4 except that in this instance the dispensing head has a cylindrical extension 42 by means of which it is simply journalled on the neck 44 of a container 45 for simple rotation thereon between a closed position and an alternate open position.

The neck 44 of the container is of the usual cylindrical configuration but is formed with a circumferential groove 46. The cylindrical extension 42 of the dispensing head 16a has an inwardly turned circumferential flange 48 that rotatably engages the upper side of the circumferential groove 46 to hold the bottom wall of the dispensing head snugly against the end surface of the container neck 44 at all times. The container neck 44 has an outlet passage 50 that is eccentrically located in the same manner as the inlet port 34 of the dispensing head. It is apparent that the dispensing head 16a may be rotated 180° from the closed position shown in Figure 6 to place the inlet port 34 in register with the outlet passage 50. Thus the form of the invention shown in Figure 6 operates in substantially the same manner as the previously described embodiments.

My description in specific detail of selected embodiments of the invention will suggest to those skilled in the art various changes, substitutions and other departures from my disclosure that properly lie within the scope of the appended claims.

I claim:

1. A device for dispensing predetermined quantities of a flowable material, comprising: a container for said material having a cylindrical portion with an outlet passage extending therethrough; a dispensing head forming a dispensing chamber to hold a predetermined quantity of the material, said head being mounted on said cylinder by screw threads to rotate thereon between a retracted tightly closed position and an extended open position, said chamber having an inlet port positioned eccentrically thereof for tightening against a blank portion of said container at the closed position of the head to cut off the chamber from the interior of the container, said inlet port being retracted from said blank portion of the container at the open position of the head to provide a space for fluid flow from said outlet passage of the container to the inlet port, said chamber having at least one discharge port and having a yieldable wall whereby the chamber may be contracted by manual pressure to cause discharge of the content of the chamber through said discharge port when said head is at its closed position.

2. A device as set forth in claim 1 in which said container has at least one yieldable wall whereby the container may be contracted in volume by manual pressure to dispense material from the container into said chamber.

3. A device as set forth in claim 1 in which said outlet passage is eccentrically positioned, the radial distances of said outlet passage and said inlet port from the axis of rotation of the dispensing head being at least approximately the same whereby at said open position of the dispensing head said inlet port of the dispensing head at least partially registers with said outlet passage.

References Cited in the file of this patent

UNITED STATES PATENTS

| | | |
|---|---|---|
| 645,101 | Jackson | Mar. 13, 1900 |
| 671,047 | Fox | Apr. 2, 1901 |
| 1,191,578 | Englund | July 18, 1916 |
| 1,408,520 | Larsen | Mar. 7, 1922 |
| 2,162,907 | Bambach | June 20, 1939 |
| 2,425,474 | Hussey | Aug. 12, 1947 |
| 2,690,278 | Bacheller | Sept. 28, 1954 |
| 2,718,023 | Douglass | Sept. 20, 1955 |